US012168292B2

(12) United States Patent
Yokono et al.

(10) Patent No.: US 12,168,292 B2
(45) Date of Patent: Dec. 17, 2024

(54) INFORMATION PROCESSING DEVICE AND INFORMATION PROCESSING METHOD

(71) Applicant: SONY CORPORATION, Tokyo (JP)

(72) Inventors: Jun Yokono, Tokyo (JP); Natsuko Ozaki, Tokyo (JP); Sayaka Watanabe, Tokyo (JP); Jianing Wu, Tokyo (JP); Tatsuhito Sato, Tokyo (JP); Midori Kawano, Tokyo (JP)

(73) Assignee: SONY CORPORATION, Tokyo (JP)

( * ) Notice: Subject to any disclaimer, the term of this patent is extended or adjusted under 35 U.S.C. 154(b) by 421 days.

(21) Appl. No.: 17/283,622

(22) PCT Filed: Oct. 10, 2019

(86) PCT No.: PCT/JP2019/039949
§ 371 (c)(1),
(2) Date: Apr. 8, 2021

(87) PCT Pub. No.: WO2020/080241
PCT Pub. Date: Apr. 23, 2020

(65) Prior Publication Data
US 2021/0387355 A1    Dec. 16, 2021

(30) Foreign Application Priority Data

Oct. 16, 2018    (JP) ................... 2018-194822

(51) Int. Cl.
*B25J 13/08*    (2006.01)
*A63H 11/00*    (2006.01)
(Continued)

(52) U.S. Cl.
CPC ............ *B25J 13/089* (2013.01); *A63H 11/00* (2013.01); *B25J 9/1664* (2013.01); *B25J 13/086* (2013.01);
(Continued)

(58) Field of Classification Search
CPC ... A63H 11/00; A63H 2200/00; B25J 9/1664; B25J 11/0005; B25J 13/086;
(Continued)

(56) References Cited

U.S. PATENT DOCUMENTS 7,089,083 B2 *   8/2006  Yokoo .................... G06N 3/006
                                                                901/1
2002/0049515 A1 * 4/2002  Osawa .................... A63H 3/28
                                                                700/245
(Continued)

FOREIGN PATENT DOCUMENTS

CN          1363072 A      8/2002
CN          1761554 A      4/2006
(Continued)

OTHER PUBLICATIONS

Wikipedia, "Electromagnetic Spectrum", Accessed Jun. 5, 2023.*
(Continued)

*Primary Examiner* — Jason Holloway
*Assistant Examiner* — Blake A Wood
(74) *Attorney, Agent, or Firm* — CHIP LAW GROUP

(57) ABSTRACT

An information processing device including: an information obtaining unit that obtains environmental information from sensor information obtained by a sensor with which an autonomous moving body is provided; an extraction unit that extracts, from the environmental information, specific environmental information to be saved; and an action control unit that controls an action of the autonomous moving body so as to output the specific environmental information to the outside.

13 Claims, 10 Drawing Sheets

(51) Int. Cl.
  *B25J 9/16*   (2006.01)
  *G05D 1/00*   (2024.01)
(52) U.S. Cl.
  CPC ......... *G05D 1/0088* (2013.01); *G05D 1/0219* (2013.01); *A63H 2200/00* (2013.01)
(58) Field of Classification Search
  CPC ... B25J 13/089; G05D 1/0088; G05D 1/0219; G05D 2201/0217; G06N 20/00
  See application file for complete search history.

(56) References Cited

U.S. PATENT DOCUMENTS

| | | | |
|---|---|---|---|
| 2002/0089297 A1* | 7/2002 | Filo | A63H 11/20 318/568.12 |
| 2004/0210345 A1 | 10/2004 | Noda et al. | |
| 2005/0049752 A1* | 3/2005 | Takamura | G05D 1/0246 700/259 |
| 2011/0118870 A1* | 5/2011 | Sugihara | G06N 3/008 700/245 |
| 2013/0178982 A1* | 7/2013 | Wong | A63H 3/001 700/258 |
| 2016/0062361 A1 | 3/2016 | Nakano | |
| 2019/0202065 A1 | 7/2019 | Hayashi | |

FOREIGN PATENT DOCUMENTS

| | | | |
|---|---|---|---|
| CN | 102189557 A | | 9/2011 |
| CN | 109689174 A | | 4/2019 |
| JP | 2001212782 A | * | 8/2001 |
| JP | 2002178283 A | | 6/2002 |
| JP | 2004-237392 A | | 8/2004 |
| JP | 2004255528 A | * | 9/2004 |
| JP | 2009-223444 A | | 10/2009 |
| JP | 2009245195 A | | 10/2009 |
| WO | 2018/047900 A1 | | 3/2018 |

OTHER PUBLICATIONS

Impinj Monza 5 Datasheet, Accessed Jun. 5, 2023.*
English Machine Translation of JP2001212782A, Accessed May 23, 2023.*
English Machine Translation of JP2004255528A, Accessed May 23, 2023.*
Additional English Translation of JP2004255528A.*
International Search Report and Written Opinion of PCT Application No. PCT/JP2019/039949, issued on Dec. 17, 2019, 09 pages of ISRWO.

* cited by examiner

FIG. 3

| SPECIFIC ENVIRONMENTAL INFORMATION | ENVIRONMENTAL INFORMATION OBTAINING METHOD | ACTION INFORMATION |
|---|---|---|
| WHO IS PERSON EXISTING AROUND? | FACE DETECTION, FACE IDENTIFICATION, FACIAL EXPRESSION RECOGNITION, HUMAN BODY DETECTION | ACTION THAT PLEASES PERSON (BANZAI, TAIL WAGGING, HEAD NODDING, ETC.) |
| IS PERSON EXISTING AROUND PLEASED? | | |
| FLOOR SURFACE IS SLIPPERY | CONTACT SURFACE SENSOR | WALKING SLOWLY |
| SPECIFIC PLACE IS WARM | ENVIRONMENTAL MAP, OWN POSITION, TEMPERATURE SENSOR | ACTION THAT GIVES COMFORTABLE IMPRESSION TO PERSON |
| HAVING BEEN SCOLDED | FACE DETECTION, FACIAL EXPRESSION RECOGNITION, VOICE RECOGNITION, TOUCH SENSOR | BENDING FORWARD, OUTPUTTING SPECIFIC SOUND |
| SPECIFIC ICON HAS BEEN DISPLAYED ON DISPLAY | ENVIRONMENTAL MAP, OBJECT DETECTION | ACTION THAT REPRESENTS JOY |
| FRIGHTENING VIDEO HAS BEEN DISPLAYED ON DISPLAY | OBJECT DETECTION, VOICE RECOGNITION, IR PATTERN | ACTION THAT REPRESENTS BEING FRIGHTENED |
| FRIGHTENING VIDEO HAS BEEN DISPLAYED ON DISPLAY | OBJECT DETECTION, VOICE RECOGNITION, IR PATTERN, PROGRAM INFORMATION | ACTION THAT REPRESENTS BEING FRIGHTENED |
| WATER PLACE | ENVIRONMENTAL MAP, OWN POSITION, VOICE RECOGNITION, OBJECT DETECTION, HYGROMETER, TEACHING FROM PERSON | NOT GETTING CLOSE |

INFORMATION PROCESSING DEVICE AND INFORMATION PROCESSING METHOD

TECHNICAL FIELD

The present technology relates to an information processing device, an information processing method, and an information processing program.

BACKGROUND ART

In recent years, for example, a dog-type or humanoid-type autonomous moving body (robot) is getting familiar to people's life. Such a robot learns from information that has been recognized in order to make various autonomous actions, and feeds the information back to an action of the robot itself

CITATION LIST

Patent Document

Patent Document 1: Japanese Patent Application Laid-Open No. 2009-223444

SUMMARY OF THE INVENTION

Problems to be Solved by the Invention

In recent years, relationship between a person and a robot is getting closer, and since a plurality of robots exists in a household or the like, relationship between robots is also getting closer. The technology disclosed in the cited document 1 is made for an autonomous action of a robot, but does not contribute to relationship between robots. In future, in a situation in which relationship of a person with a plurality of robots is becoming more and more popular, the technology that realizes relationship of information conveyance and the like between robots is required.

The present technology has been devised in consideration of such a point, and an object of the present technology is to provide an information processing device, an information processing method, and an information processing program that, by outputting information obtained by an autonomous moving body to the outside, are capable of effectively utilizing the information.

Solutions to Problems

In order to solve the above-described problems, the first technology provides an information processing device including: an information obtaining unit that obtains environmental information from sensor information obtained by a sensor with which an autonomous moving body is provided; an extraction unit that extracts, from the environmental information, specific environmental information to be saved; and an action control unit that controls an action of the autonomous moving body so as to output the specific environmental information to the outside.

In addition, the second technology provides an information processing method including the steps of: obtaining environmental information from sensor information obtained by a sensor with which an autonomous moving body is provided; extracting, from the environmental information, specific environmental information to be saved; and controlling an action of the autonomous moving body so as to output the specific environmental information to the outside.

Moreover, the third technology provides an information processing program that causes a computer to execute an information processing method, the information processing method including the steps of: obtaining environmental information from sensor information obtained by a sensor with which an autonomous moving body is provided; extracting, from the environmental information, specific environmental information to be saved; and controlling an action of the autonomous moving body so as to output the specific environmental information to the outside.

BRIEF DESCRIPTION OF DRAWINGS

FIG. 3 is an explanatory diagram illustrating specific environmental information and action information.

MODE FOR CARRYING OUT THE INVENTION

Embodiments of the present technology will be described below with reference to the drawings. It should be noted that explanations are made in the following order.
<1. Embodiment>
[1-1. Hardware configuration example of autonomous moving body 10]
[1-2. Configuration of information processing device 100]
[1-3. Specific environmental information and action information]
[1-4. Information output processing]
[1-5-1. First technique of information output]
[1-5-2. Second technique of information output]
[1-5-3. Third technique of information output]
[1-5-4. Fourth technique of information output]
[1-6. Obtaining of information]
<2. Modified example>

1. Embodiment

<1-1. Hardware Configuration Example of Autonomous Moving Body 10>

A hardware configuration example of an autonomous moving body 10 according to one embodiment of the present technology will be described. It should be noted that a case where the autonomous moving body 10 is a dog-type quadrupedal walking robot will be described below as an example. In addition, the following explanation will be made on the assumption that an activity area of the autonomous moving body is a house in which a family having a plurality of persons lives, and that the autonomous moving body lives together with the persons in the activity area.

Figure 1:
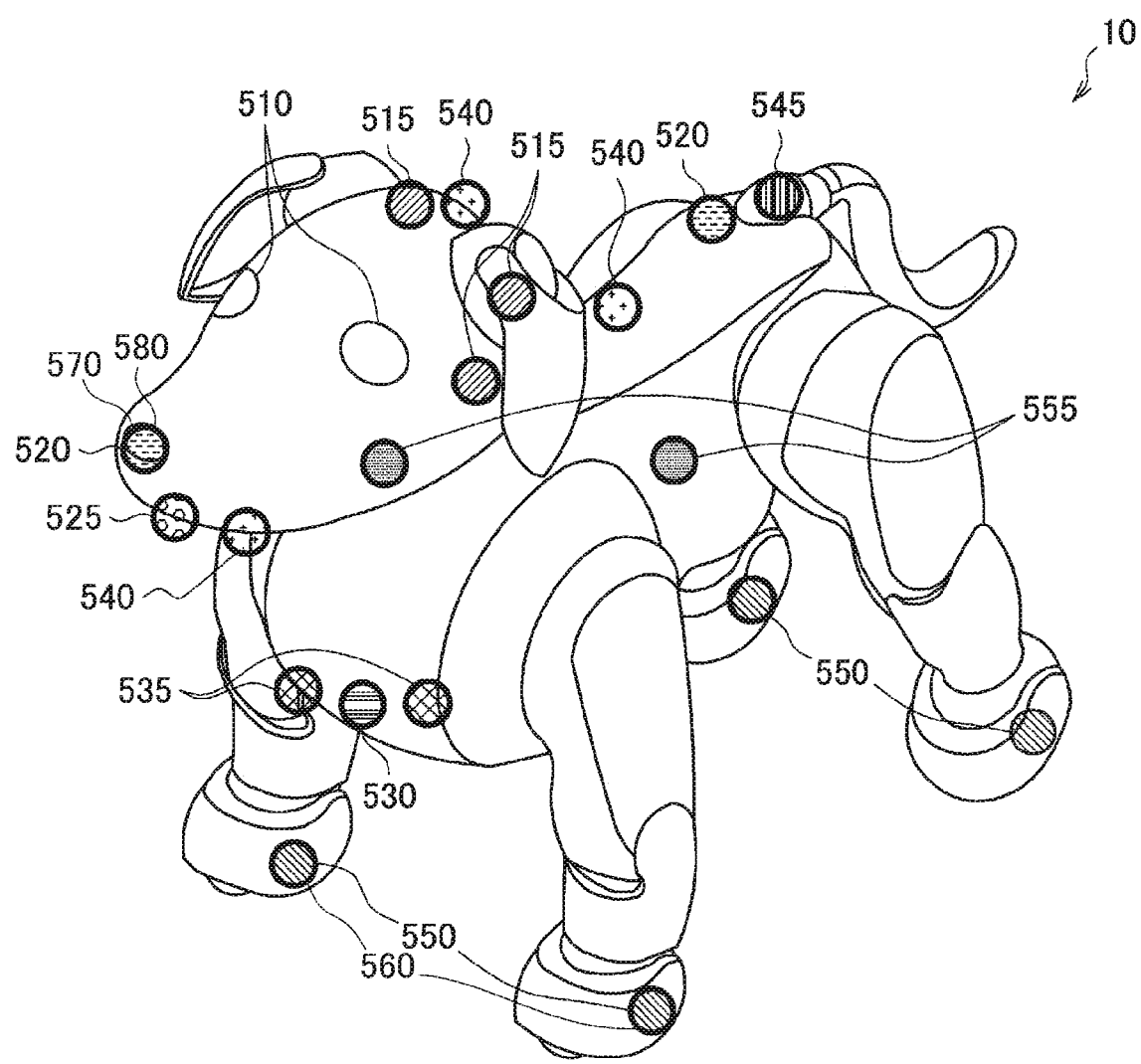
FIG. 1 is an external perspective view illustrating a configuration of an autonomous moving body.

FIG. 1 is a view illustrating a hardware configuration example of the autonomous moving body 10 according to one embodiment of the present technology. The autonomous moving body 10 is a dog-type quadrupedal walking robot that includes a head part, a body part, four leg parts, and a tail part. In addition, the autonomous moving body 10 is provided with two displays 510 on the head part thereof.

Further, the autonomous moving body 10 is provided with various kinds of sensors. The autonomous moving body 10 includes, for example, a microphone 515, a camera 520, a Time of Flight (ToF) sensor 525, a human detection sensor 530, a Position Sensitive Detector (PSD) sensor 535, a touch sensor 540, an illuminance sensor 545, a sole button 550, an inertial sensor 555, a contact surface sensor 560, an infrared sensor 570, and an ultrasonic sensor 580.

(Microphone 515)

The microphone 515 has a function of collecting surrounding sounds. The above-described sounds include, for example, an utterance of a user, and surrounding environmental sounds. The autonomous moving body 10 may be provided with, for example, four microphones on the head part thereof. By being provided with the plurality of microphones 515, a sound occurring around can be collected with high sensitivity, and localization of a sound source can be realized.

(Camera 520)

The camera 520 has a function of image-capturing a user and a surrounding environment. The autonomous moving body 10 may be provided with, for example, two wide-angle cameras on the nose tip and on the lumbar part respectively. In this case, the wide-angle camera that is arranged on the nose tip captures an image corresponding to a forward visual field (that is to say, a dog's visual field) of the autonomous moving body 10, and the wide-angle camera arranged on the lumbar part captures an image of a surrounding area focusing on the upward direction. The autonomous moving body 10 is capable of extracting, for example, characteristic points of a ceiling on the basis of, for example, an image captured by the wide-angle camera arranged on the lumbar part, and consequently Simultaneous Localization and Mapping (SLAM) can be realized.

(ToF Sensor 525)

The ToF sensor 525 has a function of detecting a distance from an object that exists ahead of the head part. The ToF sensor 525 is provided on the nose tip of the head part. By using the ToF sensor 525, distances from various objects can be detected with high accuracy, and therefore, for example, operation corresponding to a relative position from a target object including a user, or an obstacle, can be realized.

(Human Detection Sensor 530)

The human detection sensor 530 has a function of detecting a location of a user, a pet bred by the user, or the like. The human detection sensor 530 is arranged, for example, on the chest. By using the human detection sensor 530, a moving object that exists forward can be detected, and therefore various kinds of operation corresponding to the moving object, for example, operation performed in response to feelings such as interest, fear, and surprise, can be realized.

(PSD535)

The PSD sensor 535 has a function of obtaining a situation of a floor surface ahead of the autonomous moving body 10. The PSD sensor 535 is arranged, for example, on the chest. By using the PSD sensor 535, a distance from an object that exists on a floor surface ahead of the autonomous moving body 10 can be detected with high accuracy, and therefore operation corresponding to a relative position from the object can be realized.

(Touch Sensor 540)

The touch sensor 540 has a function of detecting a touch by a user. The touch sensor 540 is arranged on a region of the autonomous moving body 10, the region having a high possibility of being touched by the user, and the region including, for example, the top of the head, the chin, and the back. The touch sensor 540 may be, for example, a capacitive or pressure-sensitive touch sensor. By using the touch sensor 540, a touch act by a user can be detected, the touch act including a touch, a stroke, a pat, and a push, and therefore operation performed in response to the touch act can be performed.

(Illuminance Sensor 545)

The illuminance sensor 545 detects illuminance of a space in which the autonomous moving body 10 is located. The illuminance sensor 545 may be arranged, for example, at the base of the tail part behind the head part. By using the illuminance sensor 545, surrounding brightness can be detected, and therefore operation corresponding to the brightness can be executed.

(Sole Button 550)

The sole buttons 550 each have a function of detecting whether or not a bottom surface of the leg part of the autonomous moving body 10 is in contact with a floor. Therefore, the sole buttons 550 are arranged on regions corresponding to pads of the four leg parts respectively. By using the sole buttons 550, contact or noncontact of the autonomous moving body 10 with the floor surface can be detected, which enables a state in which the autonomous moving body 10 has been lifted by a user to be grasped, for example.

(Inertial Sensor 555)

The inertial sensors 555 are 6-axis sensors that each detect physical quantities of the head part or the body part related to speed, acceleration, rotation, and the like. In other words, the inertial sensors 555 each detect acceleration and angular speed with respect to X-axis, Y-axis, and Z-axis. The inertial sensors 555 are arranged on the head part and the body part respectively. By using the inertial sensors 555, motions of the head part and body part of the autonomous moving body 10 can be detected with high accuracy, and therefore operation control corresponding to a situation can be realized.

(Contact Surface Sensor 560)

The contact surface sensors 560 each include a tactile sensor and a pressure-sensitive sensor, and each have a function of detecting a state (hard, soft, uneven, even, etc.) of a floor surface with which a bottom surface of the leg part of the autonomous moving body 10 comes in contact. Therefore, the contact surface sensors 560 are arranged on regions corresponding to pads of the four leg parts respectively. By using the contact surface sensors 560, a state of the floor surface with which the autonomous moving body 10 comes in contact can be recognized, and therefore, for example, a state in which the floor surface is slippery can be grasped.

(Infrared Sensor 570)

The infrared sensor 570 is capable of, for example, capturing a video different from an image that can be taken by the camera 520, and measuring temperature of a target object in a noncontact manner from a distance. The infrared sensor 570 is provided, for example, on the nose tip of the autonomous moving body 10.

(Ultrasonic Sensor 580)

The ultrasonic sensor 580 is capable of determining, for example, presence/absence of a wall, a distance to the wall, presence/absence of an obstacle, and a distance to the obstacle by transmitting an ultrasonic wave, and then by receiving the returned ultrasonic wave that has been reflected by the obstacle. The ultrasonic sensor 580 is provided, for example, on the nose tip of the autonomous moving body 10.

(Environmental Map Creating Function and Own Position Estimating Function)

The autonomous moving body 10 is provided with a Simultaneous Localization and Mapping (SLAM) function, and the SLAM enables the autonomous moving body 10 to create a map of a surrounding environment of the autonomous moving body 10, and to perform own position estimation. By combinedly using sensor information from the microphone 515, the camera 520, the infrared sensor 570, the ultrasonic sensor 580, and the like, the SLAM is capable of creating an environmental map, and estimating an own position in the environmental map.

The environmental map is map format information that includes room layout information of an activity area (a house, etc.) in which the autonomous moving body 10 performs activities, information related to a shape of each room, information related to the position and shape of an object arranged in each room, and position information of a specific area. The position information of the specific area in a space in which the autonomous moving body 10 performs activities may be represented as coordinate information in which a predetermined position of the environmental map is used as a reference point. The own position information is information indicating a current position of the autonomous moving body 10 in the environmental map.

The configuration of the autonomous moving body 10 according to one embodiment of the present technology has been described above. It should be noted that the above configuration described using FIG. 1 is merely an example, and a configuration of a sensor with which the autonomous moving body 10 can be provided is not limited to such an example. Besides the above-described configuration, the autonomous moving body 10 is provided with communication functions including a Structured Light camera, a temperature sensor, a terrestrial magnetic sensor, a Global Navigation Satellite System (GNSS), Internet connection, WiFi connection, Bluetooth (registered trademark), and the like. The configuration of sensors with which the autonomous moving body 10 is provided may be flexibly deformed according to specifications and operation.

[1-2. Configuration of Information Processing Device 100]

Figure 2:
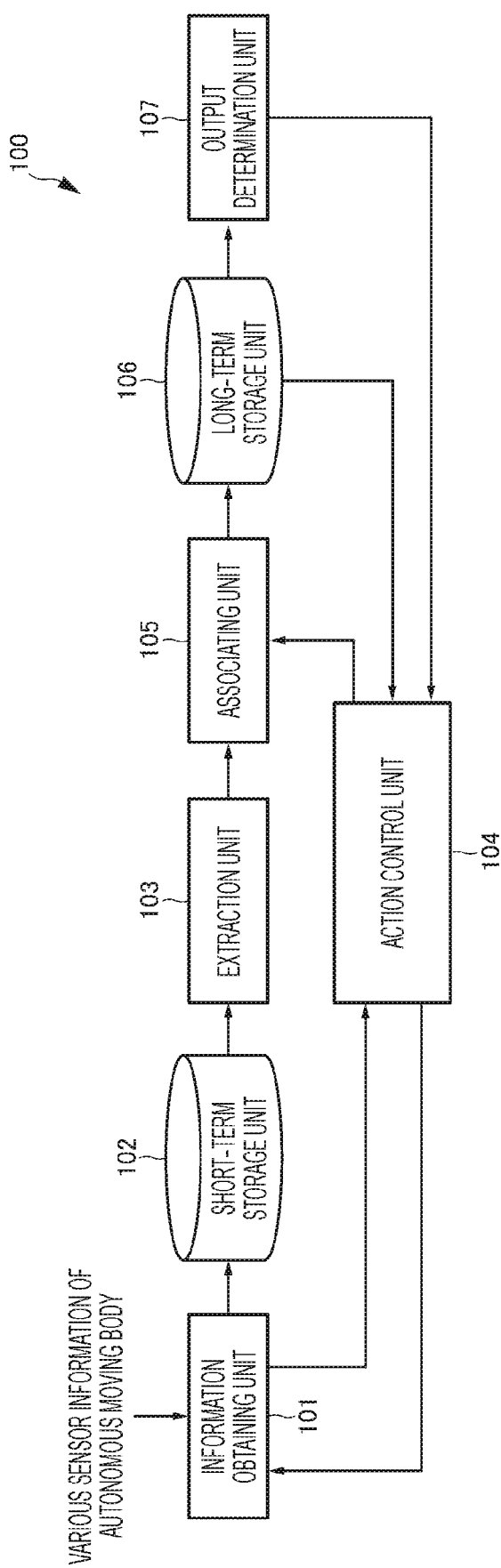
FIG. 2 is a block diagram illustrating a configuration of an information processing device.

Next, a configuration of the information processing device 100 that operates in the autonomous moving body 10 will be described with reference to FIG. 2. The information processing device 100 includes an information obtaining unit 101, a short-term storage unit 102, an extraction unit 103, an action control unit 104, an associating unit 105, a long-term storage unit 106, and an output determination unit 107.

The information obtaining unit 101 performs recognition processing, detection processing, and the like on the basis of sensor information from various sensors with which the autonomous moving body 10 is provided, and thereby obtains various information related to a surrounding environment of the autonomous moving body 10 (hereinafter referred to as "environmental information").

The environmental information obtained by the information obtaining unit 101 includes: object information obtained by object detection; information of a person's face obtained by face detection; face identification information obtained by face identification; emotional information obtained by facial expression recognition; information of a person's sight line obtained by sight line detection; moving object information obtained by moving object detection; sound-source direction information obtained by sound-source direction detection; human body information obtained by human body detection (a state of a human body including all or a part of the human body (standing, sleeping, etc.)); tracking information of a person and an object obtained by tracking processing; an environmental map and an own position obtained by SLAM; object information obtained by object recognition; and contact surface information obtained by the contact surface sensor. Face identification enables each person constituting a family in, for example, a house that is an activity area of the autonomous moving body 10 to be recognized.

These pieces of environmental information can also be mutually complemented by being combined. For example, a sound of water is detected by sound-source direction detection, thereby recognizing a position of water place, and the position is then added to an environmental map; and existence of a television set is detected by object detection, and moreover a sound of the television set is detected by sound-source direction detection, thereby recognizing a position of the television set, and the position is then added to the environmental map.

Accordingly, by using the environmental map, the autonomous moving body 10 is capable of recognizing a position of a specific zone (for example, a water place such as a kitchen, a bath, and a lavatory, a room equipped with a television set, etc.) in the activity area.

The short-term storage unit 102 stores and holds environmental information obtained by the information obtaining unit 101. The short-term storage unit 102 is a storage medium capable of temporarily saving information, the storage medium including, for example, a Random Access Memory (RAM). Accordingly, the short-term storage unit 102 saves current environmental information related to the activity area of the autonomous moving body 10. It should be noted that the short-term storage unit 102 may be provided in the information processing device 100, or the short-term storage unit 102 provided in the autonomous moving body 10 may be used.

On the basis of a predetermined rule, the extraction unit 103 extracts, from among pieces of environmental information that have been obtained by the information obtaining unit 101 and are then stored and held in the short-term storage unit 102, specific environmental information (hereinafter referred to as "specific environmental information") that should be saved in the long-term storage unit 106. The extraction unit 103 supplies the extracted specific environmental information to the associating unit 105. As an extraction rule, for example, information related to a person existing in proximity to the autonomous moving body 10 (a person who is recognized to live in the same activity area), or information related to what has pleased a person existing in proximity to the autonomous moving body 10, is extracted by priority. This is because the dog-type autonomous moving body 10 is used to please or delight a person, and therefore it is worth obtaining, by priority, information related to delighting a person. In addition, as specific environmental information, the extraction unit 103 may extract information related to a predetermined position in the activity area of the autonomous moving body 10 by priority. The specific environmental information includes, for example, information regarding a position related to an own danger. This is because information that leads to an own failure or the like, which includes, for example, information of a position of a water place, is important information required when the autonomous moving body 10 continues activities.

On the basis of the environmental information obtained by the information obtaining unit 101, the action control unit 104 determines an action of the autonomous moving body 10 by using a table in which kinds of actions prepared beforehand are defined, artificial intelligence, or the like. Subsequently, the action control unit 104 controls operation of each of the head part, the body part, the four leg parts, and the tail part, which constitute the autonomous moving body 10, and operation of each sensor, so as to control the autonomous moving body 10 in such a manner that an action corresponding to the environmental information is made. Action information indicating contents of the action made by the autonomous moving body 10 is supplied to the associating unit 105.

In addition, the action control unit 104 controls the autonomous moving body 10 on the basis of specific environmental information saved in the long-term storage unit 106, and action information associated with the specific environmental information, and thereby controls the autonomous moving body 10 in such a manner that an action corresponding to the specific environmental information is made. Moreover, the action control unit 104 controls an action of the autonomous moving body 10 in such a manner that information determined by the output determination unit 107 is output to the outside.

The associating unit 105 performs processing of saving specific environmental information supplied from the extraction unit 103 and action information supplied from the action control unit 104 in the long-term storage unit 106 with the specific environmental information associated with the action information. As a rule of association, for example, specific environmental information is associated with action information indicating an action that has been made by the autonomous moving body 10 in the timing in which the specific environmental information has been obtained by the information obtaining unit 101 and in the timing closest to the timing in which the specific environmental information has been obtained. Consequently, the associating unit 105 is capable of associating action information indicating an action that has been made by the autonomous moving body 10 on the basis of specific environmental information.

The long-term storage unit 106 saves, as long-term memory, the specific environmental information and the action information that have been associated with each other by the associating unit 105. The long-term storage unit 106 is, for example, a large-capacity storage medium that uses a hard disk, a semiconductor memory, or the like. It should be noted that the long-term storage unit 106 may be provided in the information processing device 100, or the long-term storage unit 106 provided in the autonomous moving body 10 may be used.

It should be noted that action information is supplied from the action control unit 104 to the information obtaining unit 101, the action information being information indicating an action that has been actually made by the autonomous moving body 10. Consequently, from the action of the autonomous moving body 10, the information obtaining unit 101 is capable of receiving an indication that the environmental information has changed.

The output determination unit 107 determines which information, between the specific environmental information and the action information saved in the long-term storage unit 106, is output to the outside, and determines a mode in which the information is output to the outside. Details of the information output will be described later.

By using the above-described configuration, obtaining of environmental information, extraction of specific environmental information, saving of environmental information and action information with the environmental information associated with the action information, action control of the autonomous moving body 10, and obtaining of environmental information corresponding to an action of the autonomous moving body, are always repeatedly performed so long as the autonomous moving body 10 continues activities. Therefore, at a time when the autonomous moving body 10 has just started activities under the care of an owner, only pieces of specific environmental information are accumulated in the long-term storage unit 106. However, while the autonomous moving body 10 lives together with the owner, not only specific environmental information but also action information corresponding to the specific environmental information are gradually accumulated in the long-term storage unit 106.

The information processing device 100 is configured as described above. The information processing device 100 is configured by a program; and the program may be installed in the autonomous moving body 10 beforehand, or may be installed in the autonomous moving body 10 by a user himself/herself by being downloaded or by being distributed using a storage medium. In addition, not only a program realizes the information processing device 100. The information processing device 100 may be realized by combining a hardware-based dedicated device having a function of the program, a circuit, and the like.

[1-3. Specific Environmental Information and Action Information]

Next, specific environmental information and action information will be detailed. As shown in FIG. 3, specific environmental information and action information are associated with each other by the associating unit 105, and are then saved in the long-term storage unit 106. It should be noted that the following association of specific environmental information with action information is to be construed as merely illustrative, and is not limited to the association, and thus any other association is also possible.

Pieces of specific environmental information of "who is a person that exists around (the autonomous moving body 10) itself" and "the person is pleased" are each associated with action information of "action that pleases a person (for example, banzai, tail wagging, head nodding, etc.)". This indicates an action of the autonomous moving body 10, the action being liked by the person that exists around the autonomous moving body 10. If an action that suits and is liked by a person existing around the autonomous moving body 10 is made, the person can be more pleased. The environmental information of "who is a person that exists around (the autonomous moving body 10) itself" can be obtained by face detection or human body detection; and the environmental information of "the person is pleased" can be obtained by using facial expression recognition to recognize a smile.

Environmental information of "floor surface is slippery" is associated with action information of "walk slowly (at a predetermined speed or less)". This indicates that in a case where the ground (floor) is slippery, walking slowly enables the autonomous moving body 10 to be prevented from toppling down. Environmental information of "whether or not the floor surface is slippery" can be recognized by the contact surface sensor 560.

Pieces of environmental information of "a specific place (for example, a window side in a house (activity area), etc.)" and "the specific place is warm (predetermined temperature or higher)" are each associated with action information of "an action that gives a comfortable impression to a person (lying down, closing eyes, etc.)". An action of lying down in a warm place having a predetermined temperature or higher is an action close to an actual dog, and consequently the action can cause the person to feel the autonomous moving body 10 as if it is existence close to a pet. The environmental information of "specific place" can be obtained from video from the camera 520, own position estimation, an environmental map, or the like; and the environmental information of "the specific place is warm" can be obtained by a temperature sensor.

Environmental information of "having been scolded by a person" is associated with action information of "bending forward, outputting a specific sound". The action of bending forward in the case of having been scolded is an action close to an actual dog, and consequently the action can cause the person to feel the autonomous moving body 10 as if it is existence close to a pet. The environmental information of "being scolded" can be obtained by face detection and expression detection, or by using the touch sensor 540 that detects having been beaten. In addition, in a case where a sound having a predetermined sound volume or more has been detected by voice recognition, a determination of "having gotten scolded" may be made.

Specific environmental information of "a specific icon (a logo or mark of a manufacturer of the autonomous moving body 10) has been displayed on a display" is associated with action information of "an action that represents joy (for example, making banzai, wagging its tail, getting close to a display, etc.)". In a case where the autonomous moving body 10 has recognized a manufacturer's own logo, showing an action of being pleased to an owner enables the owner's interest to be directed to the manufacturer. A specific icon displayed on the display can be recognized by, for example, an environmental map created by SLAM, or object detection based on video from the camera 520. It should be noted that as the display, any kind of display can be used so long as the display is capable of displaying video, the display including a television set, a personal computer, a tablet terminal, a screen on which video from a projector is projected, and the like.

Specific environmental information of "frightening content (video content such as a movie, etc.) has been output on the display" is associated with action information of "an action that represents being frightened (for example, closing eyes, moving back, barking, etc.)". Since there is a high possibility that such frightening content will also frighten a person, making an action of being frightened in the same manner as a person makes enables a person to be caused to feel the autonomous moving body 10 as if it is more familiar existence. In addition, prettiness of the autonomous moving body 10 can be shown to a person. Moreover, by barking toward a display and a person, a person can also be prompted to keep away from the display. Recognition of "frightening content" can be determined on the basis of: object detection based on video from the camera 520; voice recognition based on sounds collected by the microphone 515 (whether or not a sound has a predetermined frequency or higher (a cry, etc.); and an IR pattern.

It should be noted that by receiving program listing information from the Internet, specific environmental information as frightening content may be obtained on the basis of the program listing information.

Specific environmental information of "a position of a water place (a bath, a kitchen, a lavatory, etc.)" is associated with action information of "not getting close". This is because, since the autonomous moving body 10 is a precision machine, the autonomous moving body 10 should be prevented from getting close to a water place, and from getting wet with water. "Water place" can be recognized by, for example, object detection, recognition of a water sound by voice recognition, humidity to be measured by a hygrometer, or teaching from a person.

It should be noted that the environmental information is not limited to these pieces of information, and thus any kind of environmental information may be used so long as the environmental information can be obtained from pieces of information collected from various sensors with which the autonomous moving body 10 is provided. In addition, the action information is also not limited to these pieces of information, and thus any kind of action may be used so long as the action can be made by the autonomous moving body 10.

When the above-described various kinds of environmental information are obtained, the accuracy in the obtainment may be enhanced by using machine learning.

The autonomous moving body 10 continues activities in this manner, and consequently specific environmental information and action information corresponding thereto are accumulated in the long-term storage unit 106, which enables variation of action patterns to be increased, and enables actions to be efficiently produced. Environmental information that is used not only for a reflex action and a predetermined action but also for increasing the variety of actions of the autonomous moving body 10 itself can be obtained, and therefore the autonomous moving body 10 that does not tire a user can be realized. In addition, since the autonomous moving body 10 obtains information of surrounding environments as needed, the autonomous moving body 10 does not come to a standstill when an action is made. Moreover, as long-term storing, the autonomous moving body 10 is capable of accumulating information while sorting out available information.

[1-4. Information Output Processing]

Next, information output will be described. The information output means that the autonomous moving body 10 outputs specific environmental information and action information to the outside for the sake of the autonomous moving body 10 itself, and that the autonomous moving body 10 outputs specific environmental information and action information to the outside to share these pieces of information with another autonomous moving body.

As information output performed for the sake of autonomous moving body 10 itself, there is a case where specific environmental information and action information are output to an external storage device, and are then saved therein for backup, and there is a case where an article in which specific environmental information and action information are saved is placed in an activity area for the sake of an action of the autonomous moving body 10 itself.

As sharing of information with another autonomous moving body, there is a case where all information held by the autonomous moving body 10 itself are output so as to supply the information to another autonomous moving body, and there is a case where one or a plurality of pieces of information held by the autonomous moving body 10 itself is output so as to supply the information to another autonomous moving body.

Figure 4:
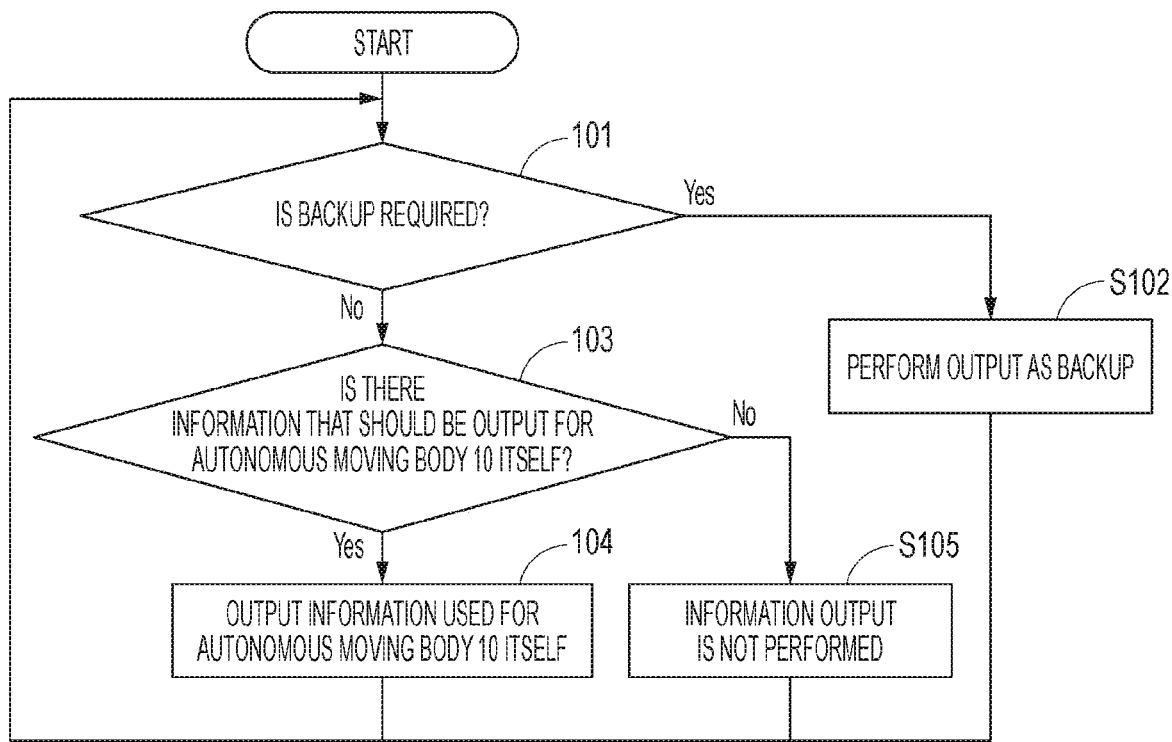
FIG. 4 is a flowchart illustrating a flow of information output processing.
Figure 5:
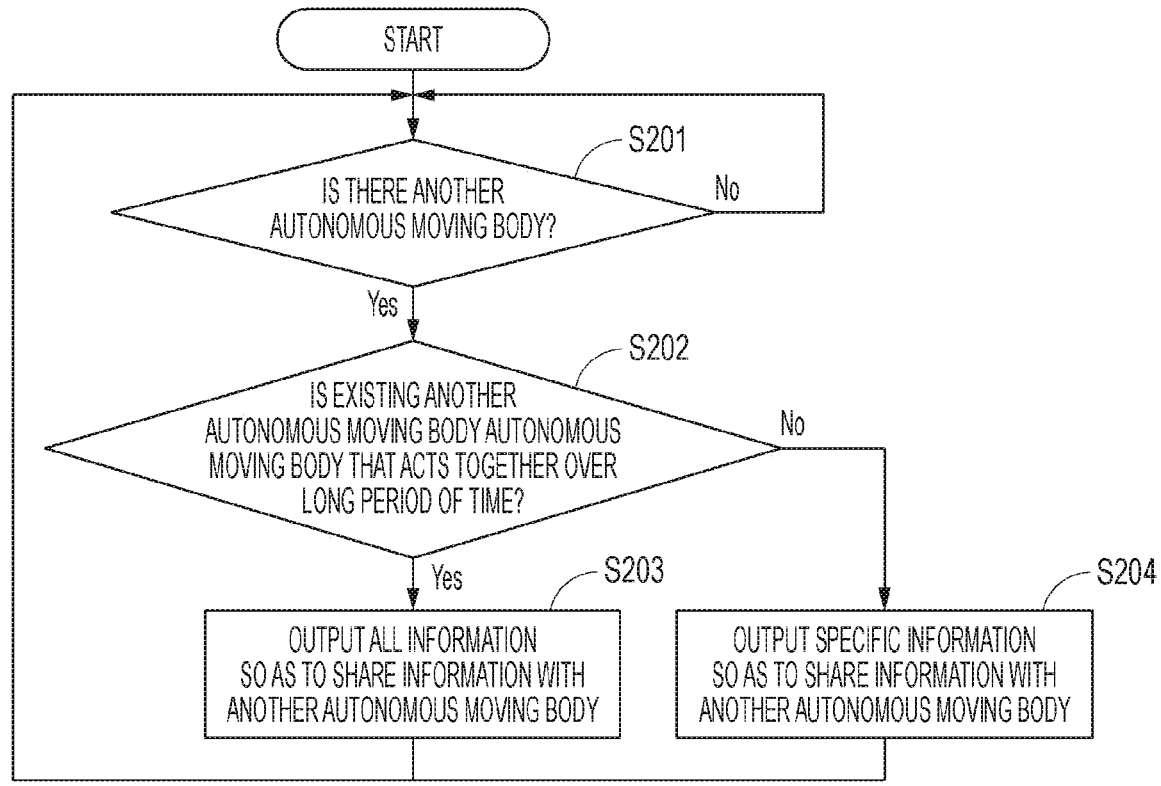
FIG. 5 is a flowchart illustrating a flow of information output processing.

Information output processing will be described with reference to flowcharts shown in FIGS. 4 and 5. With respect to this information output processing, the output determination unit 107 determines information to be output and an output mode, and the action control unit 104 controls the autonomous moving body 10 to perform information output.

First of all, information output performed for the sake of the autonomous moving body 10 itself will be described with reference to FIG. 4. In step S101, a determination is made as to whether or not specific environmental information and action information are required to be backed up.

The determination as to whether or not backup is required can be made on the basis of some determination criteria. For example, in a case where remaining capacity of the long-term storage unit 106 is the predetermined amount or less, it is determined that backup is required. In addition, in a case where predetermined specific environmental information determined beforehand has been obtained, the specific environmental information is important, and therefore it is determined that backup is required.

In a case where it has been determined that backup is required, the process proceeds to step S102 (Yes in step S101). Subsequently, in step S102, the action control unit 104 of the information processing device 100 controls an action of the autonomous moving body 10 to perform output for backup.

As the output for backup, there is a method in which the autonomous moving body 10 is moved to a position at which the autonomous moving body 10 can communicate with an external storage device such as a personal computer, a tablet terminal, a smart phone, and a smart speaker in the activity area, a communication function provided in the autonomous moving body 10 is then used to communicate with the external storage device, and thereby specific environmental information and action information are output.

It should be noted that specific environmental information and action information that are output for backup may be all information saved in the long-term storage unit 106, or may be information having high priority based on predetermined criteria.

In a case where it has been determined in step S101 that backup is not required, the process proceeds to step S103 (No, in step S101). Subsequently, in step S103, a determination is made as to whether or not there are specific environmental information and action information that should be output as information used for the autonomous moving body 10 itself.

This determination can be made, for example, by checking whether or not there is information that suits accumulated taste of the autonomous moving body 10 itself, or by checking whether or not there is specific information such as information related to the owner of the autonomous moving body 10. The information that suits the taste of the autonomous moving body 10 itself includes information of a frequently visited position (favorite place) in the activity area, and information of an unwelcome position. The information related to the owner of the autonomous moving body 10 includes: information of a position at which the owner exists with high frequency in the activity area of the autonomous moving body 10; and information of a position at which the autonomous moving body 10 has played with the owner with high frequency.

In a case where it has been determined that there are pieces of information that should be output for the autonomous moving body 10 itself, the process proceeds to step S104 (Yes in step S103). Subsequently, the action control unit 104 controls operation of the autonomous moving body 10 so as to output specific environmental information and action information that should be output as information used for the autonomous moving body 10 itself. A specific output method will be described later.

Meanwhile, in a case where it has been determined in step S103 that there is no information that should be output for the autonomous moving body 10 itself, the process proceeds to step S105 (No in step S103), and information output is not performed.

Subsequently, after any of steps S102, S104, and S105, the process returns to step S101, and steps S101 to S105 are repeated so long as the autonomous moving body 10 continues activities.

Next, output of information performed to share the information with another autonomous moving body will be described with reference to FIG. 5. In step S201, a determination is made as to whether or not there is another autonomous moving body with which specific environmental information and action information should be shared. This determination can be made by performing, for example, object detection based on video from the camera 520, and by checking whether or not another autonomous moving body has been recognized on the basis of sensor information from various sensors. In addition, in a case where an individual autonomous moving body is registered in an autonomous-moving-body network service provided by a manufacturer of the autonomous moving body 10, existence of another autonomous moving body other than the autonomous moving body 10 itself may be determined with reference to the registered information.

In a case where there is no another autonomous moving body, step S201 is repeated until it is determined that there is another autonomous moving body (No in step S201).

In a case where there is another autonomous moving body, the process proceeds to step S202 (Yes in step S201). Next, in step S202, a determination is made as to whether or not the existing another autonomous moving body is an autonomous moving body that acts together in an activity area of the autonomous moving body 10 over a long period of time (or a second or later autonomous moving body in a house or the like in which the autonomous moving body 10 performs activities). This determination can be made, for example, by recognizing another autonomous moving body from sensor information, and by checking whether or not an ID of the another autonomous moving body is registered in the autonomous-moving-body network service provided by the manufacturer of the autonomous moving body 10. In a case where the another autonomous moving body is not an autonomous moving body that acts together in an activity area of the autonomous moving body 10 over a long period of time, it can be said that the another autonomous moving body is an autonomous moving body that merely temporarily stays in the activity area (for example, an autonomous moving body possessed by an owner's friend, etc.).

In step S202, in a case where the another autonomous moving body is an autonomous moving body that acts together in the activity area over a long period of time, the process proceeds to step S203 (Yes in step S202). Subsequently, in step S203, all of specific environmental information and action information that are saved in the long-term storage unit 106 are output so as to share the information with the another autonomous moving body. The reason why all information are output is because since the another autonomous moving body acts together (lives together) in the same activity area for a long period of time, sharing all specific environmental information and action information enables more adaptive activities to be performed in the activity area. However, outputting all information is not indispensable processing, and therefore only composite information that agrees with a specific condition may be output. A specific output method will be described later.

Meanwhile, in step S202, in a case where the another autonomous moving body is not an autonomous moving body that acts together in the activity area over a long period of time (in a case where the another autonomous moving body is an autonomous moving body that merely temporarily stays), the process proceeds to step S204 (No in step S202). Subsequently, in step S204, one or a plurality of pieces of specific environmental information and action information are output so as to share the information with the another autonomous moving body. Here, the reason why not all information but one or a plurality of pieces of specific environmental information and action information are output is because if the another autonomous moving body temporarily stays in the activity area, sharing all information is not required, and sharing only pieces of information required for an action made during a period of stay suffices. However, this statement does not eliminate sharing all information.

The pieces of information required for an action made during a period of stay includes, for example: information related to safety of the autonomous moving body itself (not getting close to a water place, etc.); and information that pleases a person (operation that pleases a person, etc.). Specifically, for example, specific environmental information associated with "not getting close" that is action information in the long-term storage unit 106 is shared. This is because since the specific environmental information associated with the action information of "not getting close" is dangerous for an autonomous moving body or may cause trouble to an owner, such specific environmental information should be shared with another autonomous moving body.

The information output processing is performed in the above-described manner. On the basis of the determination made by the output determination unit 107, the action control unit 104 controls an action of the autonomous moving body 10 so as to make an action (information output action) in such a manner that the specific environmental information and the action information saved in the long-term storage unit 106 are output in a mode determined by the output determination unit 107.

[1-5-1. First Technique of Information Output]

Figure 6:
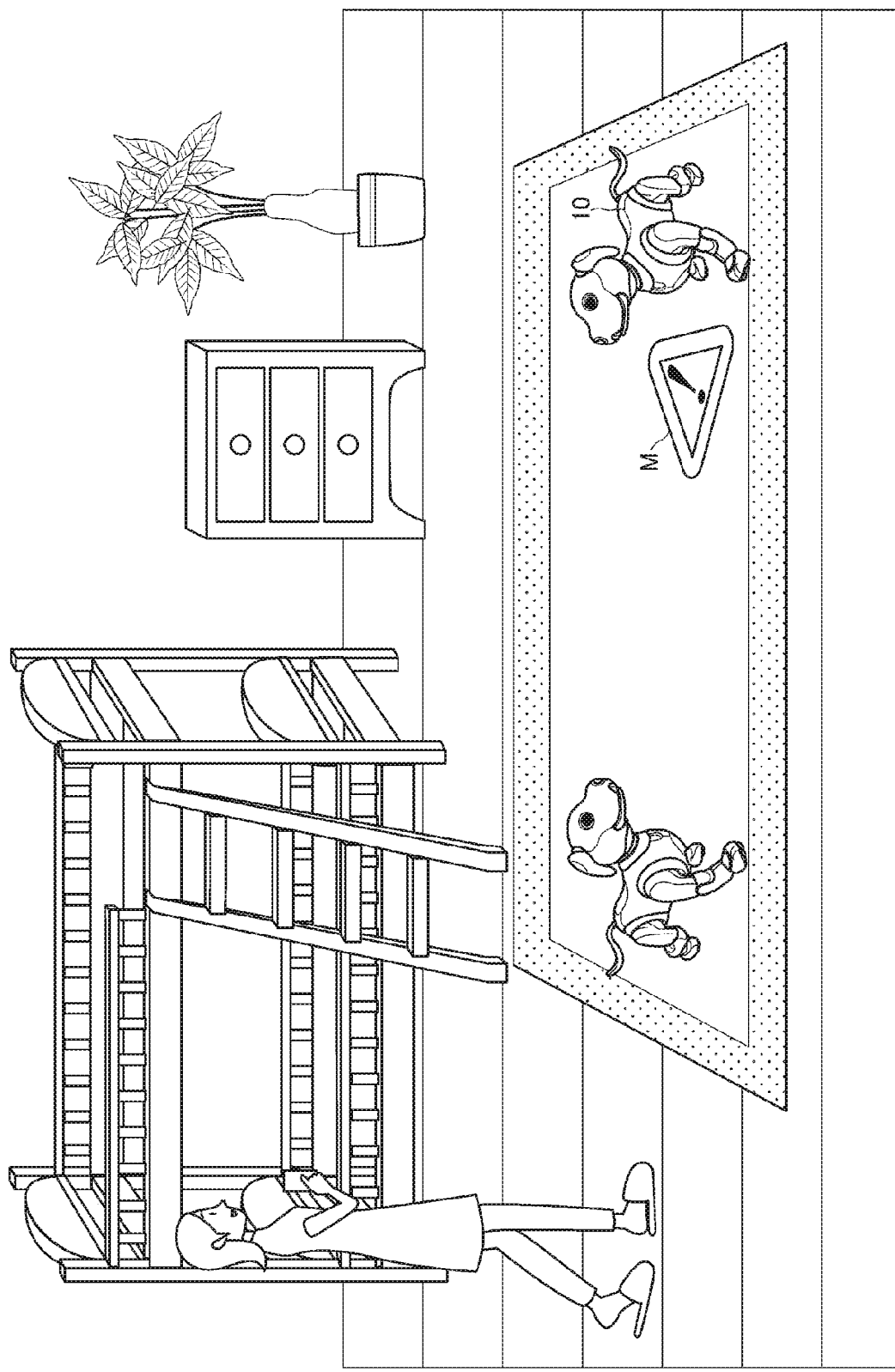
FIG. 6 is an explanatory diagram illustrating a first technique of information output.

Next, a first technique of information output will be described. As shown in FIG. 6, for example, the first technique is that a message M is drawn by using an ink that cannot be checked by visual observation by a person, but can be recognized by an autonomous moving body only by a predetermined method. As the message M, any kind of message, such as a character, a graphic symbol, and a picture, may be used so long as information can be conveyed.

The ink that can be recognized by the autonomous moving body only by the predetermined method includes, for example, an ink that can be visually recognized only by being irradiated with ultraviolet rays, the ink being called invisible ink or the like, and an ink having a specific frequency that cannot be visually recognized by a person, but can be recognized only by a camera provided on an autonomous moving body.

With respect to this first technique, the autonomous moving body 10 has an ink cartridge provided inside the head part thereof and/or inside the body part thereof, and is further provided with an ink outlet that is connected with the ink cartridge, and that discharges the ink to the outside. A mouth, a limb, or the like of the autonomous moving body 10 is provided with the ink outlet.

This first technique of information output can be used in a case where specific environmental information and action information that should be output as information used for the autonomous moving body 10 itself are output described in step S104. In addition, this first technique of information output can be used in a case where specific environmental information and action information are output so as to share the information with another autonomous moving body described in steps S203 and S204.

For example, in a case where specific environmental information of "water place" is associated with action information of "not getting close", an action of the autonomous moving body 10 is controlled so as to write, as a message, the specific environmental information and the action information at a position close to a water place. Subsequently, when another autonomous moving body recognizes the message around the water place, and obtains the specific environmental information and the action information, the action control unit 104 of the another autonomous moving body controls an action of the another autonomous moving body so as not to get close to the water place on the basis of the action information of "not getting close to the water place".

[1-5-2. Second Technique of Information Output]

Figure 7:
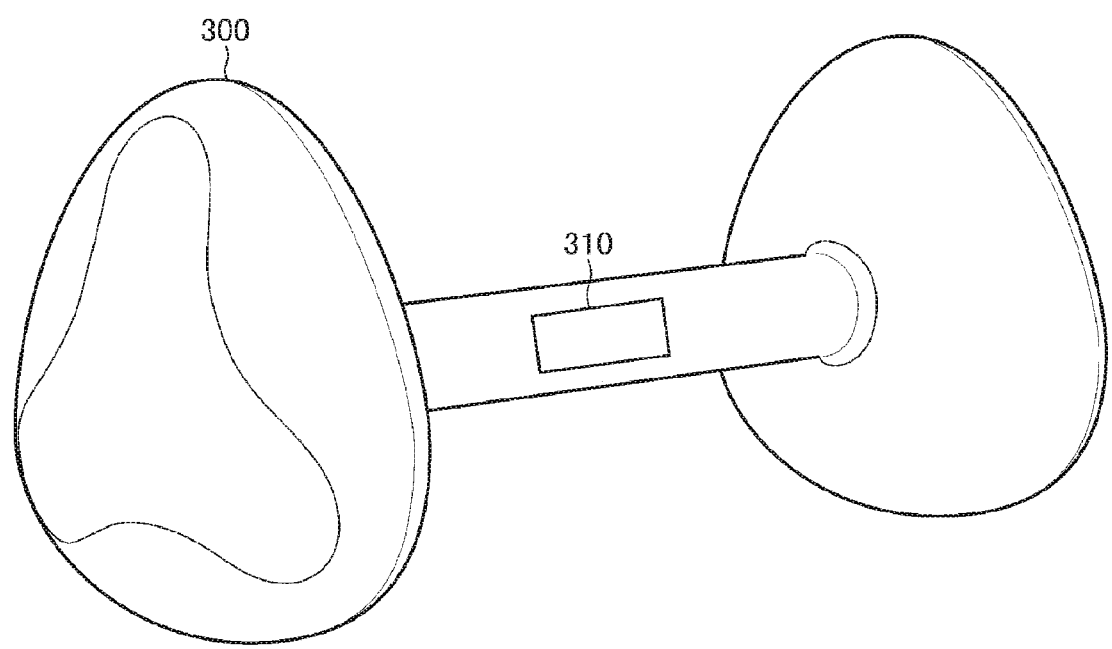
FIG. 7 is an explanatory diagram illustrating a second technique of information output.

Next, a second technique of information output will be described. The second technique relates to outputting information through a storage medium. For example, an article (a toy, etc.) for an autonomous moving body is equipped with a storage medium, and using the article by the autonomous moving body causes information to be shared. As shown in FIG. 7, with respect to the dog-type autonomous moving body 10, the article includes a bone-type toy 300. This bone-type toy 300 is provided with a non-contact-type IC card 310 as a storage medium. FeliCa (registered trademark) is mentioned as the non-contact-type IC card 310, for example. The following explanation will be made on the assumption that as shown in FIG. 7, an article is the bone-type toy 300 that can be held by the autonomous moving body 10 using a mouth, and the bone-type toy is equipped with the non-contact-type IC card 310.

This second technique of information output can be used in a case where all specific environmental information and action information are output to share the information with another autonomous moving body described in step S203, and in a case where one or a plurality of pieces of specific environmental information and action information are output to share the information with another autonomous moving body described in step S204.

With respect to this second technique, the autonomous moving body 10 is provided with a reader/writer for a storage medium, and in a case where the article is the bone-type toy 310, it is preferable that the reader/writer be provided on the mouth of the autonomous moving body 10. This is because the autonomous moving body 10 plays with the bone-type toy 300 with the bone-type toy 300 held in the mouth, and moves a position of the bone-type toy 300.

Figure 8:
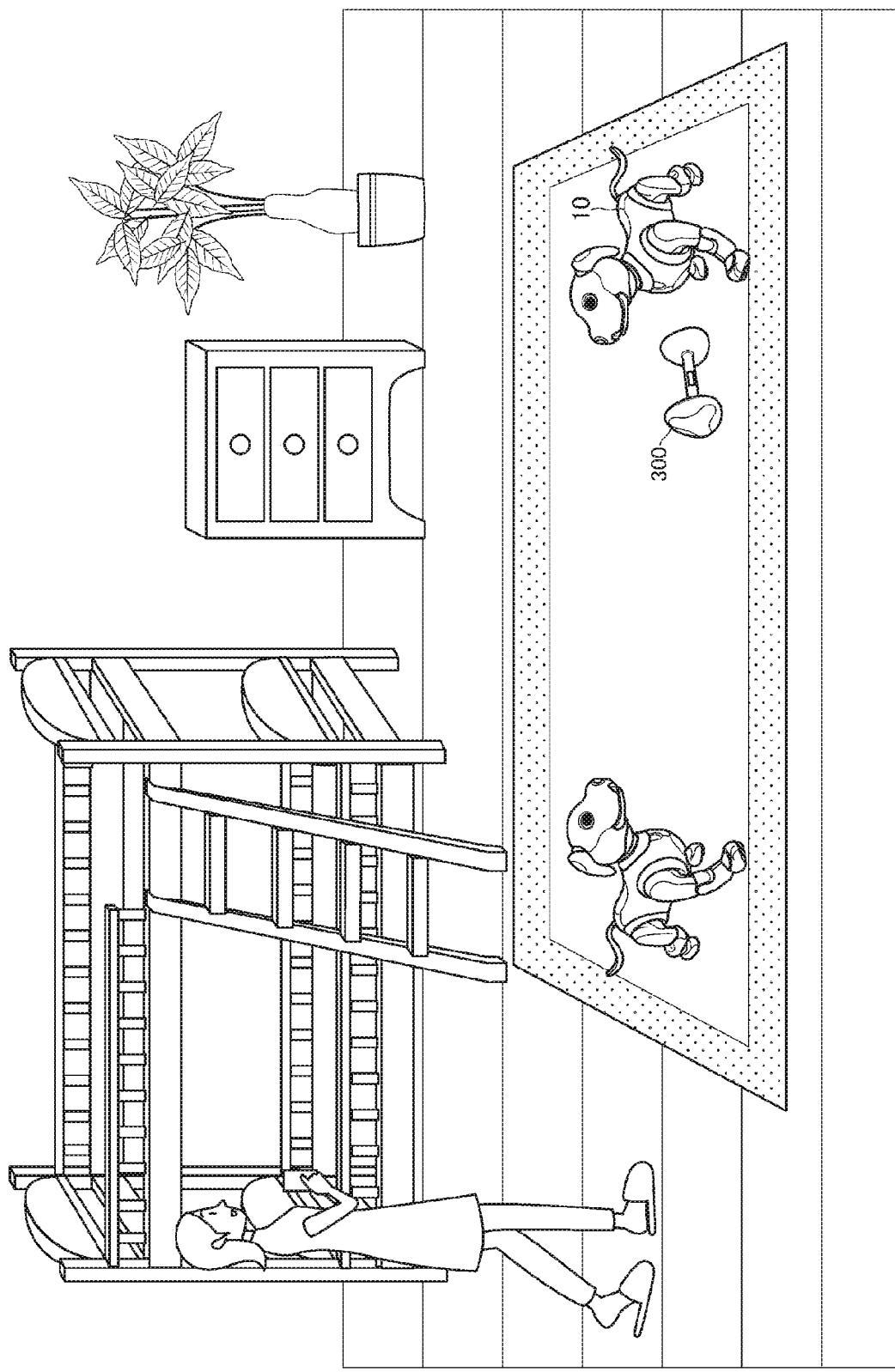
FIG. 8 is an explanatory diagram illustrating the second technique of information output.

When the autonomous moving body 10 holds the bone-type toy 300 in the mouth, and consequently the non-contact-type IC card 310 provided on the bone-type toy 300 comes close to the writer, the action control unit 104 performs control in such a manner that specific environmental information and action information saved in the long-term storage unit 106 are written to the non-contact-type IC card 310 by the writer. Subsequently, the action control unit 104 controls an action of the autonomous moving body 10 in such a manner that the bone-type toy 300 in which writing of information to the non-contact-type IC card 310 by the writer has ended is put somewhere in the activity area as shown in FIG. 8.

In addition, when another autonomous moving body holds the bone-type toy 300 in the mouth, and the non-contact-type IC card 310 provided on the bone-type toy 300 comes close to the reader, the reader performs processing of reading specific environmental information and action information saved in the non-contact-type IC card 310, and then saving the information in the long-term storage unit 106. Subsequently, when the another autonomous moving body obtains specific environmental information from sensor information of the another autonomous moving body itself, the another autonomous moving body is capable of making an action based on action information corresponding to the specific environmental information. Accordingly, even if another autonomous moving body has just come in the activity area (the house, etc.), the another autonomous moving body is capable of making an action adapted to the environment in a manner similar to the autonomous moving body 10 that exists in the environment for many years. The action adapted to the environment includes, for example, not getting close to a dangerous place in the environment, not getting close to a place of getting scolded by a holder, making an action that pleases the holder, and starting looking for a toy because the existence of the toy is already known.

By using the second technique, specific environmental information and action information can be shared between a plurality of autonomous moving bodies in this manner.

In this second technique, as a specific article used to share information, the bone-type toy 300 has been mentioned as an example. However, besides the above example, information output may be performed by ejecting a spherical (particulate) article equipped with a non-contact-type IC card from, for example, the mouth of the autonomous moving body 10. In this case, by being provided with a reader/writer in the mouth or in the body, the autonomous moving body 10 is capable of writing/reading information to/from the non-contact-type IC card. In addition, by holding or swallowing the spherical article in the mouth, another autonomous moving body is capable of reading information saved in the non-contact-type IC card by the reader to obtain the information.

[1-5-3. Third Technique of Information Output]

Next, a third technique of information output will be described. The third technique uses an article (a toy, etc.) for the autonomous moving body 10, and information is supplied and shared on the basis of the arrangement and state of the article. The article for the dog-type autonomous moving body 10 includes a bone-type toy and the like. The following explanation will be made on the assumption that the article is a bone-type toy that can be arranged at various positions and in various states, for example, by being held in the mouth by the autonomous moving body 10.

This third technique of information output can be used in a case where specific environmental information and action information that should be output as information used for the autonomous moving body 10 itself are output described in step S104. In addition, this third technique of information output can be used in a case where one of a plurality of pieces of specific environmental information and action information that have been selected are output to share the information with another autonomous moving body described in step S204.

In this third technique, an autonomous moving body on the information supply side and an autonomous moving body on the information receiving side both hold beforehand a table in which arrangement of a bone-type toy is associated with specific environmental information and action information that are indicated by the arrangement. In addition, in the first or second technique, table information indicating arrangement of a bone-type toy, and indicating meaning of the arrangement, may be shared beforehand.

Figure 9A:
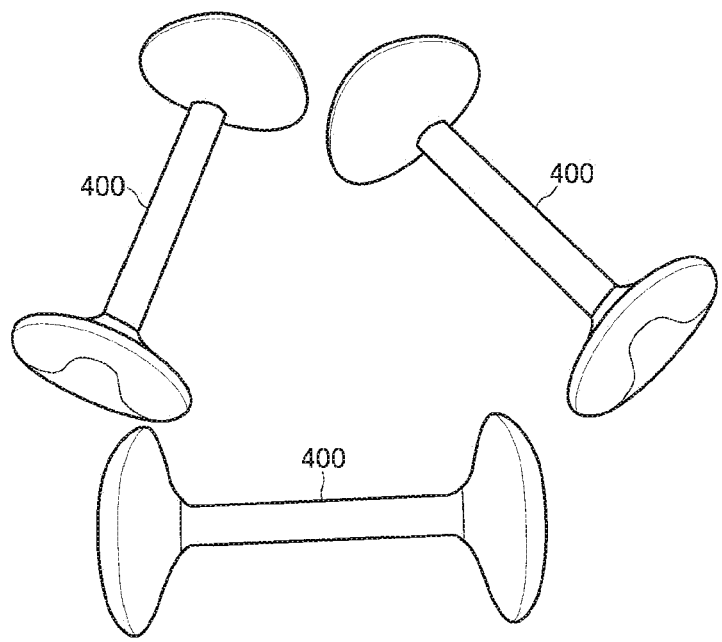
FIG. 9 is an explanatory diagram illustrating a third technique of information output.
Figure 9B:
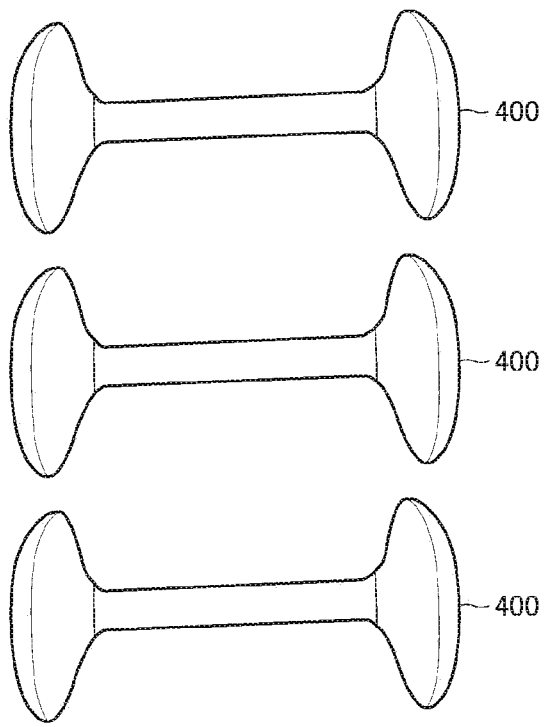

FIG. 9 illustrates, as an example, arrangement of a bone-type toy, and specific environmental information and action information that are indicated by the arrangement. For example, as shown in FIG. 9A, in a case where three bone-type toys 400 are arranged into a triangular shape, it is indicated that a place of the arrangement is a dangerous area. In addition, as shown in FIG. 9B, in a case where the three bone-type toys 400 are arranged in parallel, it is indicated that a place of the arrangement is an area in which playing with a person is allowed. It should be noted that the arrangement and information shown in FIG. 9 are to be construed as merely illustrative, the number of bone-type toys 400 to be arranged may be two, or three or more, and thus meaning represented by the arrangement is not limited to the two shown in FIG. 9.

Figure 10:
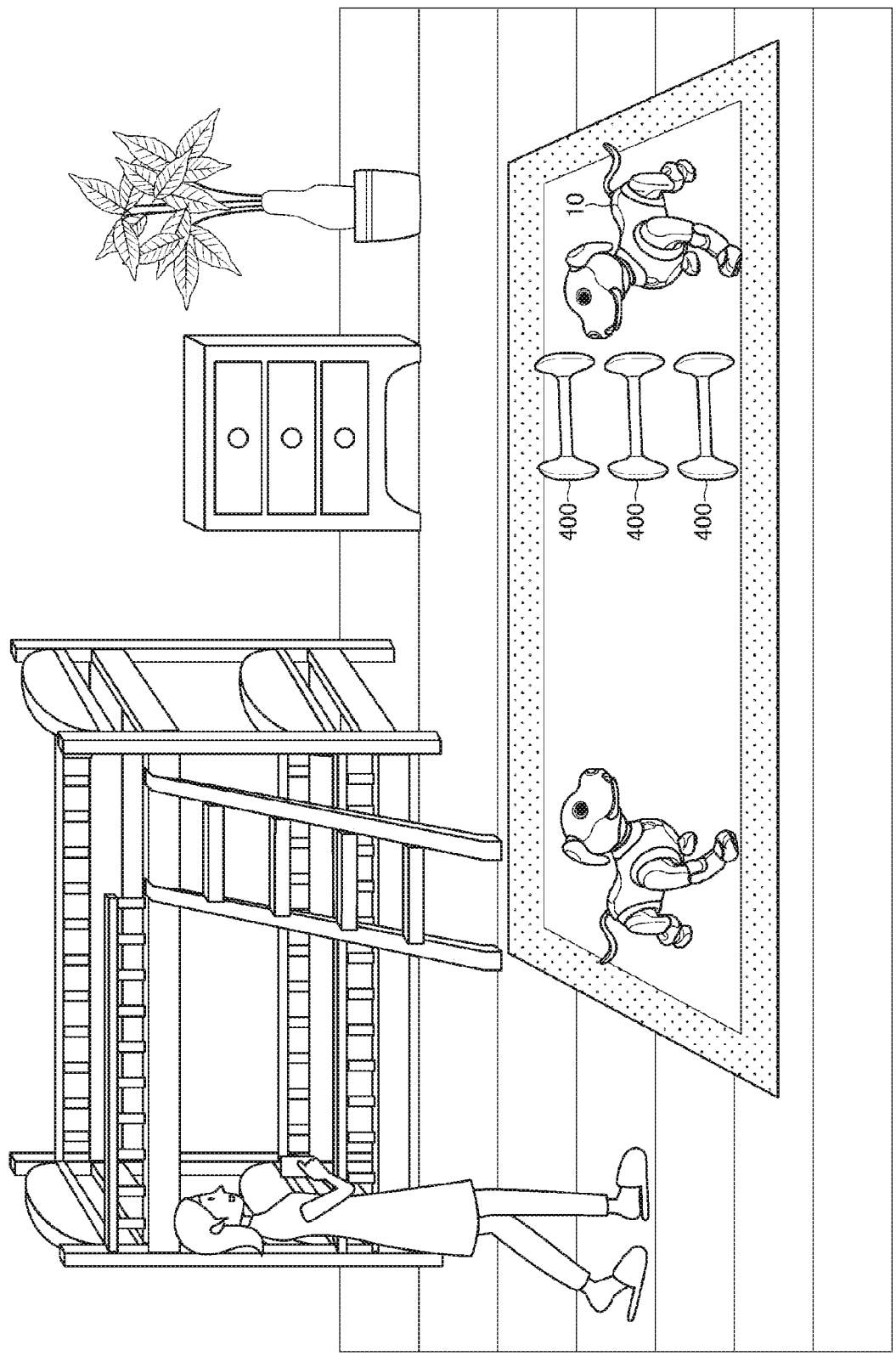
FIG. 10 is an explanatory diagram illustrating the third technique of information output.

It is assumed that the autonomous moving body 10 recognizes a predetermined place (a living room, etc.) in an activity area as specific environmental information, and that the specific environmental information is associated with action information of "playing with a person". In addition, in a case where the autonomous moving body 10 has determined that the specific environmental information and the action information are shared with another autonomous moving body, by referring to a table in which information is associated with arrangement of an article, as shown in FIG. 10, the bone-type toys 400 that are articles are arranged in a state shown in FIG. 9B corresponding to the information. Subsequently, the another autonomous moving body that has recognized the bone-type toys 400 arranged in the state of FIG. 9B recognizes that the place is an area of playing with a person, and consequently can make an action of prompting a person to play. By using the third technique, specific environmental information and action information can be shared between a plurality of autonomous moving bodies in this manner.

[1-5-4. Fourth Technique of Information Output]

Next, a fourth technique of information output will be described. The fourth technique is that specific environmental information and action information are output to an external storage device, and are then saved therein for backup of the autonomous moving body 10 itself.

As an information outputting method, the autonomous moving body 10 is connected to a personal computer, a tablet terminal, a smart phone, a smart speaker, or the like, which is an external storage device for backup, through a network beforehand by using WiFi, Bluetooth (registered trademark), or the like, or the autonomous moving body 10 is paired with the external storage device for backup beforehand. Subsequently, in a communicatable state, the autonomous moving body 10 performs wireless communication with the external storage device, and transmits specific environmental information and action information to the external storage device. The external storage device saves the specific environmental information and the action information that have been received in a storage medium provided in the external storage device itself. As with the Bluetooth (registered trademark), in a case where a communicatable range is limited, the action control unit 104 may cause the autonomous moving body 10 to move to a position at which the autonomous moving body 10 can communicate with the external storage device. It should be noted that the external storage device may be connected to the cloud through the Internet to save specific environmental information and action information in the cloud, or the autonomous moving body 10 may be directly connected to the cloud through the Internet to save specific environmental information and action information in the cloud.

According to this fourth technique, in a case where the long-term storage unit 106 has little remaining capacity, free space of the long-term storage unit 106 can be increased by saving information in the external storage device. In addition, by periodically saving information saved in the long-term storage unit 106 in the external storage device as backup, in a case where the long-term storage unit 106 gets out of order and requires replacement, the specific environmental information and the action information can be restored in the new long-term storage unit 106. Moreover, in a case where the autonomous moving body 10 gets out of order, and is brought into an inoperative state, with the result that a holder purchases a new autonomous moving body, specific environmental information and action information held in the autonomous moving body, which is in an inoperative state, can also be moved to the new autonomous moving body.

[1-6. Obtaining of Information]

Next, an information processing device 200 that operates in an autonomous moving body on the side of obtaining specific environmental information and action information, which are output in the first to fourth modes of the above-described information output, will be described. It should be noted that the configuration of the autonomous moving body is similar to that described with reference to FIG. 1.

Figure 11:
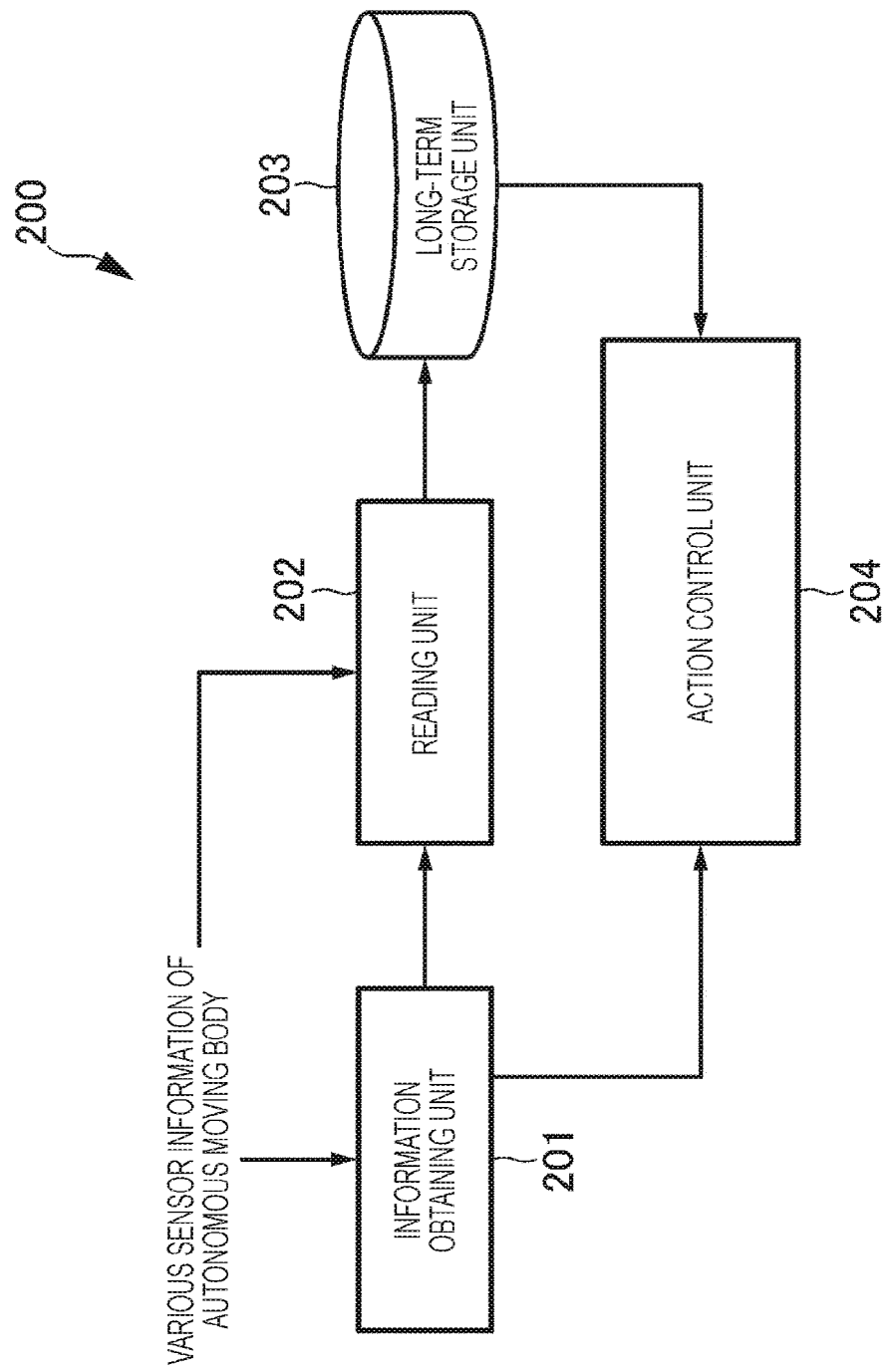
FIG. 11 is a block diagram illustrating a configuration of an information processing device on the side to obtain output information.

As shown in FIG. 11, the information processing device 200 includes an information obtaining unit 201, a reading unit 202, a long-term storage unit 203, and an action control unit 204.

The information obtaining unit 201 performs recognition processing, detection processing, and the like on the basis of output from various sensors with which an autonomous moving body is provided, and thereby obtains environmental information around the autonomous moving body.

Specifically, the information obtaining unit 201 obtains an environmental map and an own position by SLAM, and object information by object recognition. This is because, for the autonomous moving body on the information obtaining side, environmental map information, own position information in the environment, and object recognition information suffice in order to recognize a message (recognized as an object) including specific environmental information and action information, an article equipped with a non-contact-type IC card, and an article arranged in a specific state.

The reading unit 202 reads specific environmental information and action information from a message recognized by the information obtaining unit 101, an article equipped with a non-contact-type IC card, and an article arranged in a specific state. With respect to the first technique of information output described above, the reading unit 202 has a table in which a message is associated with specific environmental information and action information, and reads specific environmental information and action information from a recognized message by referring to the table. The same applies to an arrangement state of articles in the third technique of information output. It should be noted that in the second technique of information output, the reader of the non-contact-type IC card corresponds to the reading unit 202.

The long-term storage unit 203 stores and holds, as long-term memory, specific environmental information and action information that have been obtained by the reading unit 202. The long-term storage unit 203 is, for example, a large-capacity storage medium that uses a hard disk, a semiconductor memory, or the like. It should be noted that the long-term storage unit 203 may be provided in the information processing device 200, or the long-term storage unit 203 provided in the autonomous moving body may be used.

The action control unit 204 controls the operation of each part and each sensor of the autonomous moving body on the basis of specific environmental information saved in the long-term storage unit 203, and action information associated with the specific environmental information, and thereby controls the autonomous moving body in such a manner that an action corresponding to the specific environmental information is made.

The information processing device 200 in the autonomous moving body that obtains specific environmental information and action information, which have been output by another autonomous moving body, and that makes an action is configured as described above. By using this information processing device 100, information can be shared between a plurality of autonomous moving bodies.

Consequently, for example, by supplying information held by an autonomous moving body that stays in the house for many years to another autonomous moving body that has newly come to the house, or to another autonomous moving body in which the storage has been lost due to a failure, the another autonomous moving body is enabled to immediately make an action suitable for an environment of the house. More specifically, for example, the another autonomous moving body is enabled to make an action that a holder of the autonomous moving body likes, and to make an action of not getting close to an access disallowed range in the house.

In addition, by using information sharing to cause an autonomous moving body to obtain action information indicating an action that has not ever been made by the autonomous moving body, the autonomous moving body is enabled to make a new action.

Incidentally, there is also a possibility that an autonomous moving body will output information to provide the information to another autonomous moving body, and the autonomous moving body will obtain information output by the another autonomous moving body. Therefore, one autonomous moving body may be provided with both of the function of the information processing device 100 shown in FIG. 2 and the function of the information processing device 200 shown in FIG. 11.

4. Modified Example

The embodiments of the present technology have been specifically described above. However, the present technology is not limited to the above-described embodiments, and various modifications based on the technical idea of the present technology can be made.

The autonomous moving body is not limited to a dog-type autonomous moving body. The autonomous moving body may be another animal type, a humanoid type, or a robot that is neither an animal type nor a humanoid type, the robot including, for example, a working robot, a building robot, and a construction robot.

Saved environmental information is not limited to information related to an environment of a house in which a person lives described in the embodiments. The environmental information may be any information so long as the information is information of an environment around the autonomous moving body. The environmental information includes, for example, an environmental information of a construction site, and an environmental information of a building site.

As a specific article for information output, a bone-type toy has been mentioned as an example. However, a piece of paper having a paste on the back surface, or a seal that is a plastic film, may be used. By providing a seal with a non-contact-type IC card to use the seal as an article for information output, differently from the bone-type toy, the non-contact-type IC card that saves specific environmental information and action information can be fixed at a specific position. The article is useful for a case where information is desired to be arranged at a specific position in the house.

The present technology can also employ the following configurations.

(1)
An information processing device including:
an information obtaining unit that obtains environmental information from sensor information obtained by a sensor with which an autonomous moving body is provided;
an extraction unit that extracts, from the environmental information, specific environmental information to be saved; and
an action control unit that controls an action of the autonomous moving body so as to output the specific environmental information to the outside.

(2)
The information processing device set forth in the preceding (1), further including
an associating unit that associates the specific environmental information with action information indicating an action of the autonomous moving body,
in which the action control unit further controls an action of the autonomous moving body so as to output the action information associated with the specific environmental information to the outside.

(3)
The information processing device set forth in the preceding (2), in which
the action information is information indicating an action made in a case where the autonomous moving body has obtained the specific environmental information.

(4)
The information processing device set forth in any of the preceding (1) to (3), in which
the specific environmental information is information indicating a state of a person who exists in proximity to the autonomous moving body.

(5)
The information processing device set forth in any of the preceding (1) to (4), in which
the specific environmental information is information indicating a state of a predetermined position in an activity area of the autonomous moving body.

(6)
The information processing device set forth in the preceding (2), in which
the associating unit associates the specific environmental information with the action information indicating an action that has been made by the autonomous moving body on the basis of the specific environmental information.

(7)
The information processing device set forth in any of the preceding (1) to (6), in which
an action of the autonomous moving body causes the environmental information and the action information to be written to a storage medium provided in an article, and consequently outputting to the outside is performed.

(8)
The information processing device set forth in the preceding (7), in which
the autonomous moving body is an animal-type autonomous moving body, and the article is a toy used for the autonomous moving body.

(9)
The information processing device set forth in any of the preceding (1) to (8), in which
an article is arranged by an action of the autonomous moving body, and consequently outputting to the outside is performed.

(10)
The information processing device set forth in any of the preceding (1) to (9), in which
a message is written by an action of the autonomous moving body, and consequently outputting to the outside is performed.

(11)
The information processing device set forth in any of the preceding (1) to (10), in which
the message is written with a material that is invisible to a person.

(12)
The information processing device set forth in any of the preceding (1) to (11), in which
outputting to the outside is performed by transmitting the specific environmental information to an external storage device.

(13)
The information processing device set forth in any of the preceding (1) to (12), in which
the specific environmental information is saved in a storage medium capable of long-term storage as information that should be saved for a long period of time.

(14)
The information processing device set forth in any of the preceding (1) to (13), further including
an output determination unit that determines the specific environmental information to be output to the outside.

(15)
An information processing method including the steps of:
obtaining environmental information from sensor information obtained by a sensor with which an autonomous moving body is provided;
extracting, from the environmental information, specific environmental information to be saved; and controlling an action of the autonomous moving body so as to output the specific environmental information to the outside.

(16)

An information processing program that causes a computer to execute an information processing method, the information processing method including the steps of:
obtaining environmental information from sensor information obtained by a sensor with which an autonomous moving body is provided;
extracting, from the environmental information, specific environmental information to be saved; and
controlling an action of the autonomous moving body so as to output the specific environmental information to the outside.

REFERENCE SIGNS LIST 10, 20 Autonomous moving body
100, 200 Information processing device
101 Information obtaining unit
103 Extraction unit
104 Action control unit
105 Associating unit
107 Output determination unit
300, 400 Bone-type toy
310 Non-contact-type IC card

The invention claimed is:

1. An information processing device, comprising:
circuitry configured to:
obtain sensor information from a sensor associated with a first autonomous moving body;
determine environmental information from the obtained sensor information;
extract, from the determined environmental information, first specific environmental information;
determine the extracted first specific environmental information matches with second specific environmental information; and
control, based on the determination that the extracted first specific environmental information matches with the second specific environmental information, the first autonomous moving body to:
write, based on the extracted first specific environmental information, a message on an activity area of the first autonomous moving body, and
share the written message with a second autonomous moving body.

2. The information processing device according to claim 1, wherein the circuitry is further configured to:
associate the extracted first specific environmental information with action information, wherein the action information indicates an action of the first autonomous moving body; and
control the first autonomous moving body to transmit, the action information associated with the extracted first specific environmental information, to outside of each of the information processing device and the first autonomous moving body.

3. The information processing device according to claim 2, wherein the action information is information indicating the action made by the first autonomous moving body at a timing at which the first specific environmental information is extracted.

4. The information processing device according to claim 2, wherein the circuitry is further configured to associate the extracted first specific environmental information with the action information indicating an action that has been made, by the first autonomous moving body, based on third specific environmental information.

5. The information processing device according to claim 1, wherein the circuitry is further configured to control the first autonomous moving body to write each of the determined environmental information and action information to a storage medium of an article.

6. The information processing device according to claim 5, wherein
the first autonomous moving body is an animal-type autonomous moving body, and
the article is a toy for the first autonomous moving body.

7. The information processing device according to claim 1, wherein the extracted first specific environmental information is information indicating a state of a person who exists in proximity to the first autonomous moving body.

8. The information processing device according to claim 1, wherein the extracted first specific environmental information is information indicating a state of a position in an activity area of the first autonomous moving body.

9. The information processing device according to claim 1, wherein the circuitry is further configured to control the first autonomous moving body to arrange an article.

10. The information processing device according to claim 1, wherein the message is written with a material that is invisible to a person.

11. The information processing device according to claim 1, wherein the circuitry is further configured to store the extracted first specific environmental information in a storage medium that stores information for a specific period of time.

12. An information processing method, comprising:
obtaining sensor information from a sensor associated with a first autonomous moving body;
determining environmental information from the obtained sensor information;
extracting, from the determined environmental information, first specific environmental information;
determining the extracted first specific environmental information matches with second specific environmental information; and
controlling, based on the determination that the extracted first specific environmental information matches with the second specific environmental information, the first autonomous moving body to:
write, based on the extracted first specific environmental information, a message on an activity area of the first autonomous moving body, and
share the written message with a second autonomous moving body.

13. A non-transitory computer-readable medium having stored thereon, computer-executable instructions which, when executed by a computer, cause the computer to execute operations, the operations comprising:
obtaining sensor information from a sensor associated with a first autonomous moving body;
determining environmental information from the obtained sensor information;
extracting, from the determined environmental information, first specific environmental information;
determining the extracted first specific environmental information matches with second specific environmental information; and
controlling, based on the determination that the extracted first specific environmental information matches with the second specific environmental information, the first autonomous moving body to:
write, based on the extracted first specific environmental information, a message on an activity area of the first autonomous moving body, and
share the written message with a second autonomous moving body.

* * * * *